United States Patent
Pasquet (10) Patent No.: US 9,677,707 B2
(45) Date of Patent: Jun. 13, 2017

(54) LUBRICATION SYSTEMS FOR BEARING ASSEMBLIES

(71) Applicant: ALSTOM Renewable Technologies, Grenoble (FR)

(72) Inventor: Pierre Pasquet, Alella (ES)

(73) Assignee: ALSTOM Renewable Technologies, Grenoble (FR)

( * ) Notice: Subject to any disclaimer, the term of this patent is extended or adjusted under 35 U.S.C. 154(b) by 170 days.

(21) Appl. No.: 14/135,291

(22) Filed: Dec. 19, 2013

(65) Prior Publication Data

US 2014/0193263 A1    Jul. 10, 2014

Related U.S. Application Data

(60) Provisional application No. 61/776,552, filed on Mar. 11, 2013.

(30) Foreign Application Priority Data

Jan. 10, 2013   (EP) ..................................... 13382004

(51) Int. Cl.
*F16N 7/38*      (2006.01)
*F16N 29/00*     (2006.01)
(Continued)

(52) U.S. Cl.
CPC ............. *F16N 7/385* (2013.01); *F03D 80/70* (2016.05); *F16C 33/6674* (2013.01); *F16N 7/40* (2013.01);
(Continued)

(58) Field of Classification Search
CPC . F16N 7/385; F16N 7/40; F16N 29/00; F16N 2250/04; F16N 2250/40;
(Continued)

(56) References Cited

U.S. PATENT DOCUMENTS

| 4,370,956 A | * | 2/1983 | Moser | .................... F01M 5/021 |
| | | | | 123/142.5 R |
| 4,511,016 A | * | 4/1985 | Doell | ........................ F16N 7/40 |
| | | | | 184/6.11 |

(Continued)

FOREIGN PATENT DOCUMENTS

| JP | 2009-243490 | 10/2009 |
| WO | WO 2007/134815 | 11/2007 |

OTHER PUBLICATIONS

Search report in EP 13382004.3 dated Jun. 20, 2013.

*Primary Examiner* — Minh Truong
(74) *Attorney, Agent, or Firm* — Dority & Manning, P.A.

(57) ABSTRACT

A lubrication system is disclosed for a bearing assembly, the bearing assembly having at least one bearing. The lubrication system may comprise a pump circuit, an injection circuit, an extraction circuit and at least one three-way valve. The pump circuit may comprise at least a pump. The injection circuit may provide lubricant to the bearing during an injection mode of operation. The extraction circuit may extract lubricant from the bearing during an extraction mode of operation. A flow combination topology of the first three-way valve may allow operation of the lubrication system in the injection mode or in the extraction mode or in both modes simultaneously.

16 Claims, 4 Drawing Sheets

(51) Int. Cl.
*F16N 7/40* (2006.01)
*F03D 80/70* (2016.01)
*F16C 33/66* (2006.01)

(52) U.S. Cl.
CPC .......... *F16N 29/00* (2013.01); *F16N 2250/04* (2013.01); *F16N 2250/40* (2013.01); *Y02E 10/722* (2013.01)

(58) Field of Classification Search
CPC .. F03D 11/0008; F03D 80/70; F16C 33/6674; F16C 33/105
See application file for complete search history.

(56) References Cited

U.S. PATENT DOCUMENTS

| | | | | |
|---|---|---|---|---|
| 4,520,902 A * | 6/1985 | Snow | ...................... | F16N 25/02 137/596.12 |
| 5,121,599 A * | 6/1992 | Snyder | ................... | F01D 25/20 184/6.11 |
| 5,447,184 A * | 9/1995 | Betancourt | ........ | F01M 11/0458 134/169 C |
| 5,634,345 A * | 6/1997 | Alsenz | ................ | F04B 39/0207 184/7.4 |
| 5,964,318 A * | 10/1999 | Boyle | .................... | F01M 11/04 123/196 S |
| 6,267,147 B1 | 7/2001 | Rago | | |
| 8,181,746 B2 * | 5/2012 | Szolomayer | ........... | B01D 45/16 137/38 |
| 8,869,940 B2 * | 10/2014 | Johnson | .................... | F16N 7/40 184/6.12 |
| 2010/0012434 A1 * | 1/2010 | Pisseloup | ............... | B42D 15/00 184/6.11 |
| 2013/0236308 A1 * | 9/2013 | Tietze | .................... | F03D 7/026 416/1 |
| 2015/0252944 A1 * | 9/2015 | Kreutzkaemper | .. | F16C 33/6625 184/6.1 |
| 2015/0292675 A1 * | 10/2015 | Schjott | ............... | F03D 11/0008 184/6.4 |

* cited by examiner

LUBRICATION SYSTEMS FOR BEARING ASSEMBLIES

This application claims the benefit of European Patent Application no. 13382004.3 filed on Jan. 10, 2013 and U.S. Provisional Patent Application Ser. No. 61/776,552 filed on Mar. 11, 2013, the disclosures of which are hereby incorporated by reference in their entirety for all purposes.

The present invention relates to bearings and more specifically to lubrication systems for bearing assemblies.

BACKGROUND ART

Large bearings, and particularly large rolling bearings, are typically submitted to heavy loads. Such heavy loads may be imposed to these bearings either in stress conditions or at rest. Although each bearing may be appropriately selected and dimensioned for a particular heavy load application, proper lubrication may generally be regarded as an important factor for its overall performance during the bearing's estimated service life.

Although rolling bearings often work well in non-ideal conditions, sometimes minor problems may cause bearings to fail quickly and unpredictably. For example, under a stationary (non-rotating) load, small vibrations can gradually press out the lubricant (or grease) between the races and rollers or balls of the bearing. This situation is known as false brinelling. To avoid false brinelling, accurate and local lubrication is required, particularly in the area where the load transmission between rolling elements and raceways takes place. The quality of the lubricant is also of utmost importance in order to prevent failure modes. As a consequence, old lubricant needs to be removed at a regular basis in order to maintain sufficient lubrication properties.

Another factor that affects performance of a bearing is the volume of lubricant in the bearing. Typically, bearings are delivered filled with their corresponding lubricant at an ideal percentage, which in some applications may be about 60% of their free volume. Regular lubrication cycles intend to maintain the volume of lubricant inside the bearing close to that ideal percentage. However, after a significant operating time, the volume of lubricant inside the bearing may divert from the ideal percentage.

If the volume of lubricant falls short of the ideal percentage, then the hydro dynamic lubricant layer may become thin or disappear in certain points or areas. Consequently, the friction at the load transmission areas may increase and so does the risk of wear initiation. Furthermore, the increased friction increases in turn the temperature of the remaining lubricant. Thus, the lubricant may suffer accelerated aging damage which may affect its performance. In extreme cases, damaged additives, soaps and oil may even accelerate the initiation of fatigue signs inside the bearing.

On the other hand, bearings working with a level of lubricant above the ideal level may be exposed to local excess pressure inside the component due to the combined effects of accumulation of lubricant close to the bearing inlets and rolling motion of the balls or rollers in the same area. An overpressure inside a bearing may lead to failure of the sealing means. For example, in case of 4 points contact slew bearings, rubber seals may pop out of their housing and leave the component exposed to lubricant leakage and external agent contamination. This last consequence may be critical for the service life of bearings since it may generally lead to indentation effects or corrosion of the raceways in case water or solid contaminants enter inside the bearing. The final effect may be the requirement for substitution of the component well before its expected service life.

The above problems are of particular importance in large bearings in the wind energy sector. Wind turbine generators employ large bearing assemblies, such as the main, pitch and yaw bearing assemblies that are subject to particularly heavy loads. Furthermore, the orientation of the bearings, with respect to, for example, the wind turbine rotor blade, may lead to high concentrations of lubricant in certain areas during periods of low or no wind. For example, in a pitch bearing assembly of a wind turbine generator, certain zones of the bearings may suffer from lubricant concentration and the bearings may potentially be affected by an internal overpressure at these zones. One such zone may be the bearing zones in the rotor plane at the trailing edge of the blades of the wind turbine. A combination of gravity and centrifugal forces may cause concentration of lubricant and overpressure in the affected zones.

To mitigate these problems, manufacturers of lubricant systems have developed specific products with the aim of bringing fresh lubricant to the bearing at reduced intervals. Control systems of lubrication systems range from local fixed intervals lubrication control solutions to external lubrication control solutions. In the latter case, controllers may also manage when and how much lubricant is applied to the bearing.

With respect to the lubricant recovery, some bearings' designers suggest closed outlets for keeping the lubricant inside the bearing and a passive extraction of the lubricant only during maintenance operations. In some alternative solutions, individual deposits may be fixed to the bearing outlets for a continuous passive recovery of the lubricant. These deposits may be emptied or replaced during maintenance operations.

Finally, active systems have been developed for the used lubricant recovery. In some cases, lubricant may be extracted from the bearing outlets, while in others a small intermediate deposit may be connected to the bearing outlet with a suction element which extracts the lubricant from these deposits.

In wind turbine generators, the most advanced existing solutions offer control of the lubricant injection only, depending on the working conditions of the bearing. In these cases, the lubricant extraction from the bearing is carried out by active systems which depend on the lubricant injection.

However, although the existing lubrication control systems may be able to monitor precisely the amount of injected lubricant, the amount of remaining lubricant inside the bearing remains out of their scope. Furthermore, the distribution of lubricant inside the bearing remains unknown.

SUMMARY OF THE INVENTION

There is a need for a new lubrication system that at least partially resolves some of the above mentioned problems. It is an object of the present disclosure to fulfil such a need.

In a first aspect, a lubrication system is disclosed for a bearing assembly, the bearing assembly having at least one bearing. The lubrication system may comprise a pump circuit, an injection circuit, an extraction circuit and at least a first three-way valve. The pump circuit may comprise at least a pump. The injection circuit may provide lubricant to the bearing during an injection mode of operation. The extraction circuit may extract lubricant from the bearing during an extraction mode of operation. The first three-way valve may have a first port coupled to the pump circuit, a second port to the lubricant injection circuit and a third port to the lubricant extraction circuit. A flow combination topology of the first three-way valve may allow operation of the lubrication system in the injection mode or in the extraction mode or in both modes simultaneously. The three-way valves may be T-shaped 3-way valves to allow operation of the lubrication system in either or both modes.

One aspect of the proposed solution is that the lubricant injection circuit may be dissociated or decoupled from the lubricant extraction circuit. Therefore any discrepancy between injection and extraction of lubricant may be compensated after each lubrication cycle.

In some embodiments, the lubrication system may comprise a first monitoring element and/or a second monitoring element, coupled to the injection circuit and/or the extraction circuit, respectively, for measuring the volume of lubricant injected and/or extracted in the bearing during a lubrication cycle. The first three-way valve may be operable in response to a measurement of the monitoring elements. The first three-way valve may define a passageway between the pump and the extraction circuit when a monitoring element indicates a lubricant volume above a desired value and a passageway between the pump and the injection circuit when a monitoring element indicates a volume below a desired value.

The purpose of the monitoring elements is to provide information about the quantity of lubricant injected to, and about the quantity of lubricant extracted from, the bearing during an injection, extraction or combined injection-extraction mode. A central control system may receive this information and act accordingly on the lubrication system. Thanks to the monitoring elements, the central control system may be able to keep a balance between the injected and extracted volumes of lubricant. Moreover, since the central control system may be aware of the initial volume of lubricant inside the bearing (as this parameter is part of the quality control plan of the component at the manufacturing warehouse), it may also be able to inform about possible deviations in regards to under- or over-filling. As a result, failure modes of operation of the respective bearing may be prevented.

In some embodiments, the lubrication system may comprise a local pressure measuring instrument, coupled to the bearing, for measuring the pressure of lubricant at a proximal point of the bearing. The extraction circuit may then include a first extraction sub-circuit and a second extraction sub-circuit. The first extraction sub-circuit may be coupled to the bearing substantially at or near the proximal point. The first extraction sub-circuit may be selectively operated in response to a lubricant pressure measurement by the local pressure measuring instrument at the proximal point that is above a desired value. Accordingly, the injection circuit may include a first injection sub-circuit and a second injection sub-circuit. The first injection sub-circuit may be coupled to the bearing substantially at or near the proximal point. The second injection sub-circuit may be connected to the bearing further away from the proximal point. The first injection sub-circuit may be selectively operated in response to a lubricant pressure measurement by the local pressure measuring instrument at the proximal point that is below a desired value.

The main advantage of the local pressure measuring instrument is that, apart from controlling the overall volume of lubricant inside the bearing, the lubrication system may also control the distribution of lubricant within the bearing. This may help avoid local lubricant concentrations and, consequently, any sealing failures at the affected points. This is also particularly advantageous in pitch bearing assemblies of wind turbine generators, where specific local lubricant accumulation points may appear due to the topology of the pitch bearing assembly and due to the centrifugal forces subject to the rotation of the wind turbine rotor. These points may be the points at the cross-section of the pitch bearings plane with the rotor plane.

In some embodiments the monitoring elements may be flow meters and/or manometers. A flow-meter may be connected to a recovery line in order to inform the central control system about possible failures in the recovery line, such as leakage or line breakage. The flow-meter may also deliver information about the used lubricant volume extracted from the bearing. This information may be more reliable than the calculation of the volume of extracted lubricant from the bearing depending on the number of lubrication cycles and the metering of the extraction devices. Accordingly, the central control system may be informed about the volume of lubricant injected thanks to the accurate metering of the injection devices which deliver always the same volume of lubricant at each injection cycle.

By accurately measuring the volume of lubricant injected and extracted it is possible to predict with great accuracy the amount of lubricant present inside the bearing at any given moment. Therefore, should there be any discrepancy between the expected volume and the measured volume, it is possible to take early corrective measures, such as provide extra injection cycles or extra extraction cycles.

In some embodiments, the injection circuit and the extraction circuit may be coupled to a plurality of bearings. The lubricant injection circuit may include a plurality of injection devices. Each injection device may be coupled to one bearing of the plurality of bearings, respectively. Each injection device may comprise a plurality of injectors. Each injector may be coupled to the respective bearing at a different point. Accordingly, the extraction circuit may include a plurality of extraction devices. Each extraction device may be coupled to one bearing of the plurality of bearings, respectively. Each extraction device may comprise a plurality of extractors. Each extractor may be coupled to the respective bearing at a different point.

In some embodiments, the injection devices may be arranged in series in the injection circuit. Accordingly, the extraction devices may be arranged in series in the extraction circuit, respectively. In these embodiments, the lubrication system may further comprise a second three-way valve coupled to the pump. The first three-way valve may be coupled to the first injection device and to the first extraction device in the series, respectively, and the second three-way valve may be coupled to the last injection device and to the last extraction device in the series, respectively. The advantage of having two 3-way valves in a circuit is that a more homogenous pressure may be achieved throughout the lubrication circuit during a lubrication cycle.

In some embodiments the 3-way valve may be manual and in other automatic, such as an electro-valve. In case of manual valves, the central control system may deliver to the maintenance staff information regarding the volume of lubricant inside the bearing, as well as a recommendation of used lubricant to be extracted or fresh lubricant to be injected. In case of electro valves, the disassociation of the injection and extraction circuits may be performed automatically on demand of the central control system. The corresponding operations of lubricant injections or extractions required to keep the volumes balanced may also be performed by the central control system. In embodiments where a plurality of valves is present, some of the valves may be automatic while others may be manual.

In both cases, manual or automatic, the lubrication system may be able to operate extra injection or extraction cycles in order to keep the volume of lubricant balanced inside the bearing. This may be possible due to the respective volumes registered by the central control system.

In another aspect, a pitch bearing assembly for a wind turbine generator is disclosed. The pitch bearing assembly may comprise three bearings and a lubrication system according to any of the embodiments described above. The advantage of having a dissociated lubrication system in a pitch bearing assembly is that the volume and distribution of lubricant in the respective bearings may be better controlled, thus increasing the durability of the bearings and reducing the maintenance and repair costs. As a result, the service life of the pitch bearings may be extended which may significantly reduce the maintenance costs of the overall wind turbine generator.

In yet another aspect, a wind turbine generator is disclosed comprising a bearing assembly according to any of the embodiments described above.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
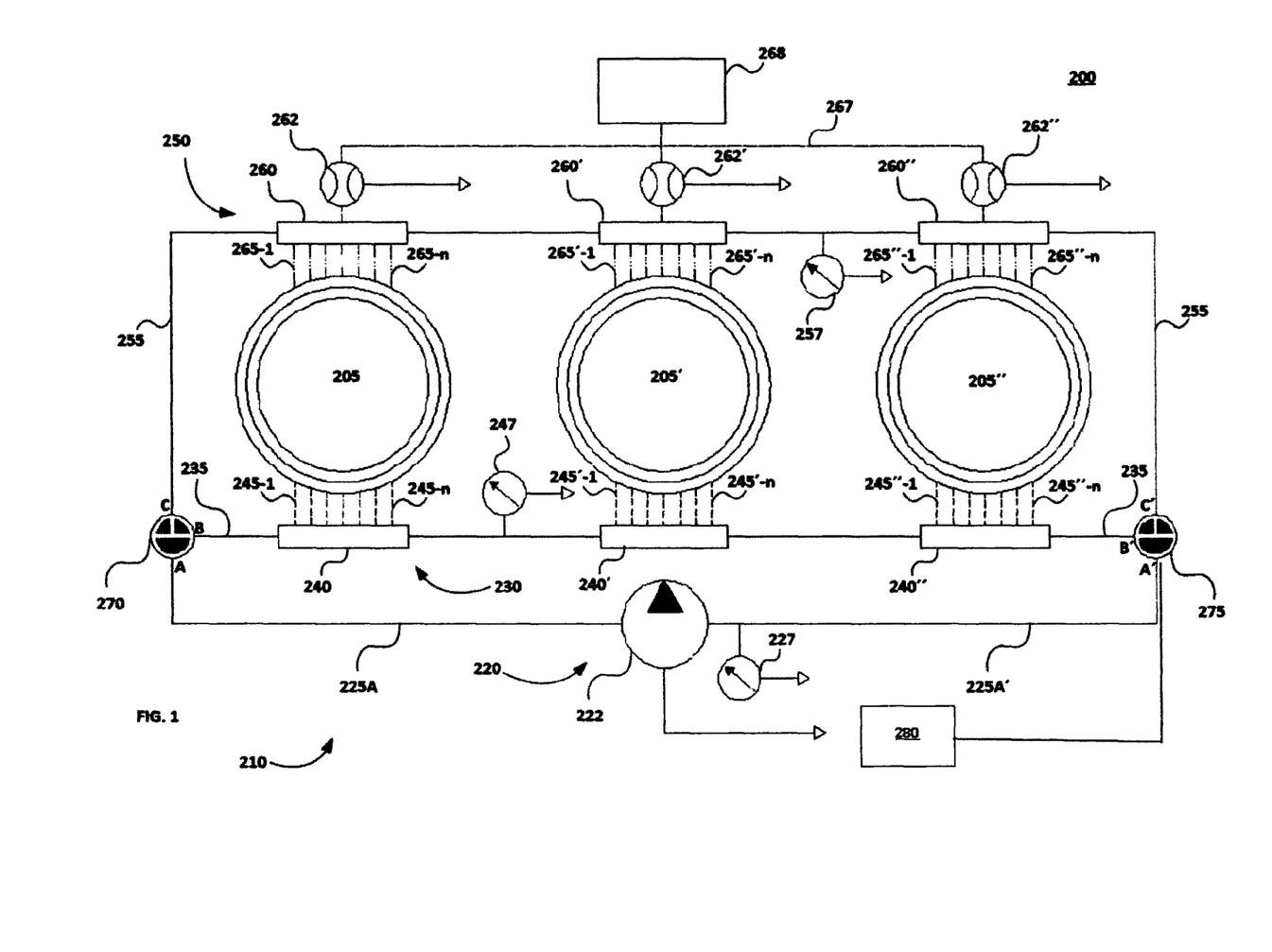
FIG. 1 is a block diagram of a bearing assembly according to an embodiment.

FIG. 1 is a block diagram of a bearing assembly according to an embodiment. Bearing assembly 200 may include three bearings 205, 205' and 205" and lubrication system 210. Lubrication system 210 may include pump circuit 220, injection circuit 230, extraction circuit 250 and 3-way T-shaped valves 270, 275. Each of the 3-way valves 270, 275 may have a first port A, A' coupled to the pump circuit 220, a second port B, B' coupled to the injection circuit 230 and a third port C, C' coupled to the extraction circuit 250.

Pump circuit 220 may include pump 222 and main line 225. Main line 225 may have two branches, 225A and 225A', one coupled to first port A of valve 270 and the other coupled to first port A' of valve 275. Each of the two branches 225A and 225A' may be split in an injection branch 235 and an extraction branch 255. The main line 225, and consequently, the injection branch 235 and the extraction branch 255, are used to supply pressure to the injection circuit 230 and to the extraction circuit 250, respectively. The pump circuit may also include a pressure measuring device 227, such as a manometer, for measuring the pressure of the lubricant at a point along the main line 225.

Injection circuit 230 may include injection branch 235 and three injection devices 240, 240', 240". The injection branch 235 supplies pressure to the injection devices 240, 240', 240". The injection branch 235 may be connected at one end to port B of valve 270 and at the other end to port 13' of valve 275. The injection devices 240, 240' and 240" may be distributed along the injection branch 235 at or near their respective bearings 205, 205' and 205". Each injection device 240, 240' and 240" may comprise a lubricant deposit (not shown), a plurality of injection lines 245-1 to 245-$n$, 245'-1 to 245'-$n$ and 245"-1 to 245"-$n$, and a pumping element, respectively, for pumping lubricant to the bearing. Injection circuit 230 may further include a pressure measuring device 247, such as a manometer, for measuring the pressure of the lubricant at a point along the injection branch 235.

Extraction circuit 250 may include extraction branch 255 and three extraction devices 260, 260', 260". Extraction branch 255 may be coupled at one end to port C of valve 270 and at the other end to port C' of valve 275. The extraction devices 260, 260' and 260" may be distributed along the extraction branch 255 at or near their respective bearings 205, 205' and 205". Each extraction device 260, 260' and 260" may comprise a plurality of extraction lines 265-1 to 265-$n$, 265'-1 to 265'-$n$ and 265"-1 to 265"-$n$, respectively, for extracting lubricant from their respective bearing 205, 205', 205". Each extraction device 260, 260' and 260" may also be connected to a flow-meter 262, 262' and 262", respectively, for measuring the volume of lubricant extracted from the respective bearing. Extraction circuit 250 may further include a recovery tank 268 for collecting all extracted lubricant via a recovery line 267. Extraction circuit 250 may further include a pressure measuring device 257, such as a manometer, for measuring the pressure of the lubricant at a point along the extraction branch 255.

The 3-way valves 270, 270' may assume 4 distinct positions. In a first position, the ports B, B' and C, C' may be closed and no injection or extraction of lubricant takes place. In a second position, the ports B, B' and C, C' may all be open and the lubrication system may simultaneously inject and extract lubricant. In a third position, ports B, B' are open and C, C' are closed, and in this situation, the lubrication system may only inject lubricant to the bearings. In a fourth position, ports B, B' are closed and ports C, C' are open, and thus the lubrication system may only extract lubricant from the bearings.

In a typical scenario, the 3-way valve moves from the previously mentioned first position to the previously mentioned second position initiating a lubrication cycle. The pump circuit may be equipped with a deposit of fresh lubricant and an electrical motor which actuates pumping elements and may provide lubricant at a given pressure to the injection circuit. An integrated control system 280 may deliver to the wind turbine generator (WTG) control information about the amount of fresh lubricant inside the deposit and the pressure at the pump inlet during a lubrication cycle. The WTG control may interact with the pump and start a lubrication cycle on demand. The lubrication line may be connected to the pump and feed the injection devices of the injection circuit with fresh lubricant. It may also simultaneously actuate the extraction devices. The injection devices may deliver a metered quantity of fresh lubricant to the bearing through the injection lines after finalizing each pressuring cycle in the main line where they are connected. The extraction devices may extract the same metered quantity of used lubricant from the bearing and bring it through the extraction circuit to the used lubricant deposit. Once the lubrication cycle is completed, the flow meters and the pressure meters communicate their values to a central lubrication monitoring centre. In case all communicated values are within limits, no action takes place and the 3-way valve assumes the first position until the next lubrication cycle. In case at least a value is off limits then a selective injection or extraction takes place.

In one example scenario, the value that is off limits is the value of a monitoring element indicating that the volume of lubricant extracted during the lubrication cycle is more than the foreseen volume. In that case, more lubricant needs to be injected. The extra amount to be injected may be calculated as the absolute difference between the foreseen volume and the actual volume as counted by the flow meter. Once the extra amount has been calculated, the valve assumes the third position and an injection cycle takes place until the extra amount has been injected. Once the monitoring element confirms injection of the extra amount, the valve assumes the first position.

In another example scenario, the value that is off limits is the value of a flow meter indicating that the volume of lubricant extracted during the lubrication cycle is less than the foreseen volume. In that case, more lubricant needs to be extracted. The extra amount to be extracted may be calculated as the difference between the foreseen volume and the actual volume as counted by the flow meter. Once the extra amount has been calculated, the valve assumes the fourth position and an extraction cycle takes place until the extra amount has been extracted. Once the flow meter confirms extraction of the extra amount, the valve assumes the first position.

Figure 2:
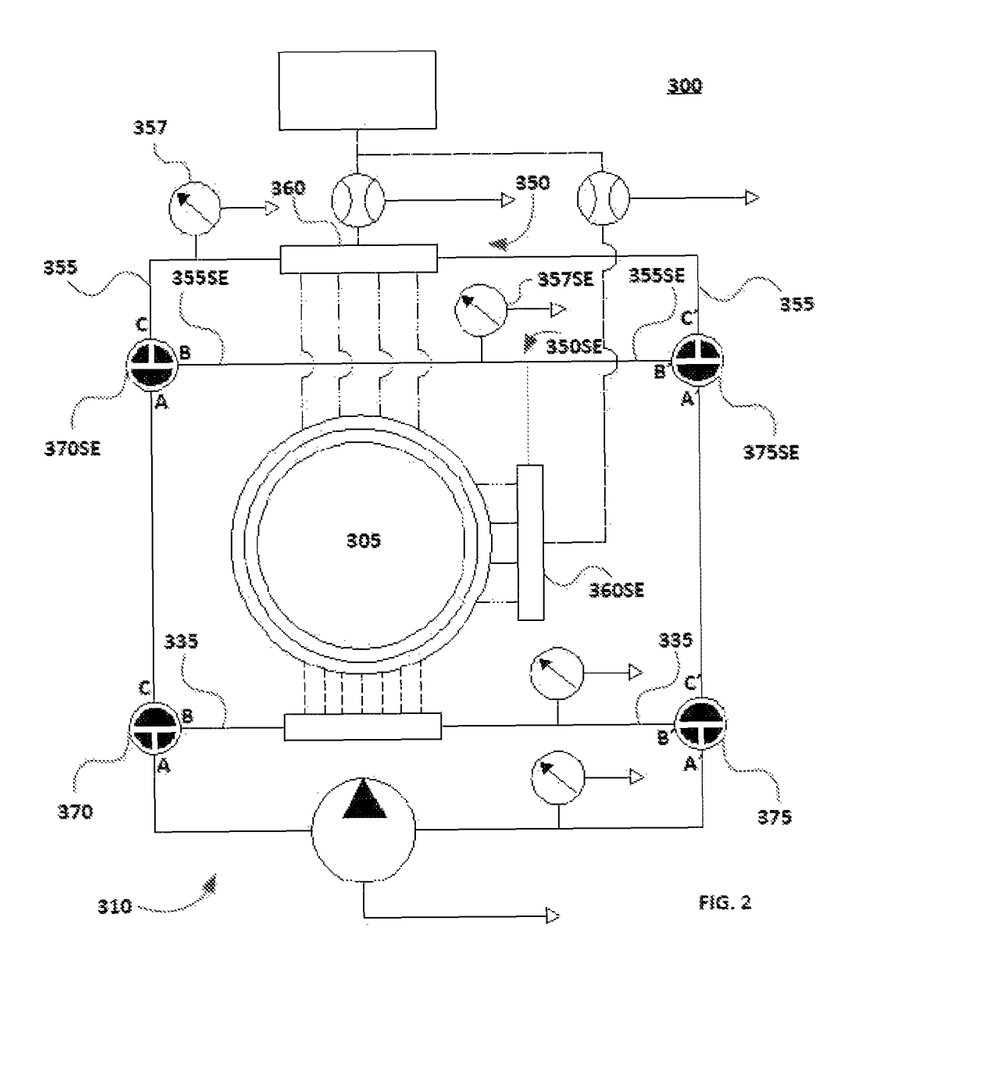
FIG. 2 is a block diagram of a bearing assembly according to another embodiment.

FIG. 2 is a block diagram of a bearing assembly according to another embodiment. Bearing assembly 300 may include one bearing 305 and lubrication system 310. Lubrication system 310 may include a pump circuit and an injection circuit similar to the pump circuit 220 and the injection circuit 230 described with reference to FIG. 1. Furthermore, lubrication system 310 may include primary extraction sub-circuit 350, secondary extraction sub-circuit 350SE and 3-way T-shaped valves 370, 375, 370SE and 375SE. Each of the 3-way valves 370, 375 may have a first port A, A' coupled to the pump circuit, a second port B, B' coupled to the injection branch 335 and a third port C, C' connected to a lubrication line that leads to a first port A, A' of the 3-way pumps 370SE, 375SE, respectively. Each of the 3-way valves 370SE, 375SE may have a second port B, B' coupled to the extraction branch 355SE of the secondary extraction sub-circuit 350SE and a third port C, C' connected to the primary extraction sub-circuit 350.

Primary extraction sub-circuit 350 may include extraction branch 355 and an extraction device 360. Extraction branch 355 may be connected at one end to a lubrication line that leads to port C of valve 370SE and at the other end to port C' of valve 375SE. The extraction device 360 may comprise a plurality of extraction lines for removing lubricant from bearing 305. The extraction device 360 may also be connected to a flow-meter, as discussed with reference to FIG. 1, for measuring the volume of lubricant extracted from the respective bearing. Primary extraction sub-circuit 350 may further include a pressure measuring device 357, such as a manometer, for measuring the pressure of the lubricant at a point along the extraction branch 355.

Now, secondary extraction sub-circuit 350SE may have an extraction branch 355SE and an extraction device 360SE. Extraction branch 355SE may be coupled at one end to port B of valve 370SE and at the other end to port B' of valve 375SE. The extraction device 360SE may comprise a plurality of extraction lines for extracting lubricant from bearing 305. The extraction device 360 may also be connected to a flow-meter, as discussed with reference to FIG. 1, for measuring the volume of lubricant extracted from the respective bearing. Secondary extraction sub-circuit 350SE may further include a pressure measuring device 357SE, such as a manometer, for measuring the pressure of the lubricant at a point along the extraction branch 355SE.

The secondary extraction sub-circuit may be connected to the bearing substantially at or near a point on the bearing where concentration of lubricant is anticipated. In that way, should the device 357SE measure an increased pressure, it may be possible to selectively operate only the secondary lubricant extraction sub-circuit by appropriately orientating the 3-way valves. For example, if there is a need to only remove lubricant from a pressure point, the 3-way valves 370 and 375 shall have the vertical axis of the T-shape facing outwards, while the 3-way valves 370SE and 375SE shall have the vertical axis of the T-shape facing towards the A, A' points. The term "vertical axis" is used to denote the perpendicular bisector line in a T-shape. Therefore the pump circuit may be connected only with the secondary extraction sub-circuit 355SE and only extraction device 360SE may be operable.

Figure 3:
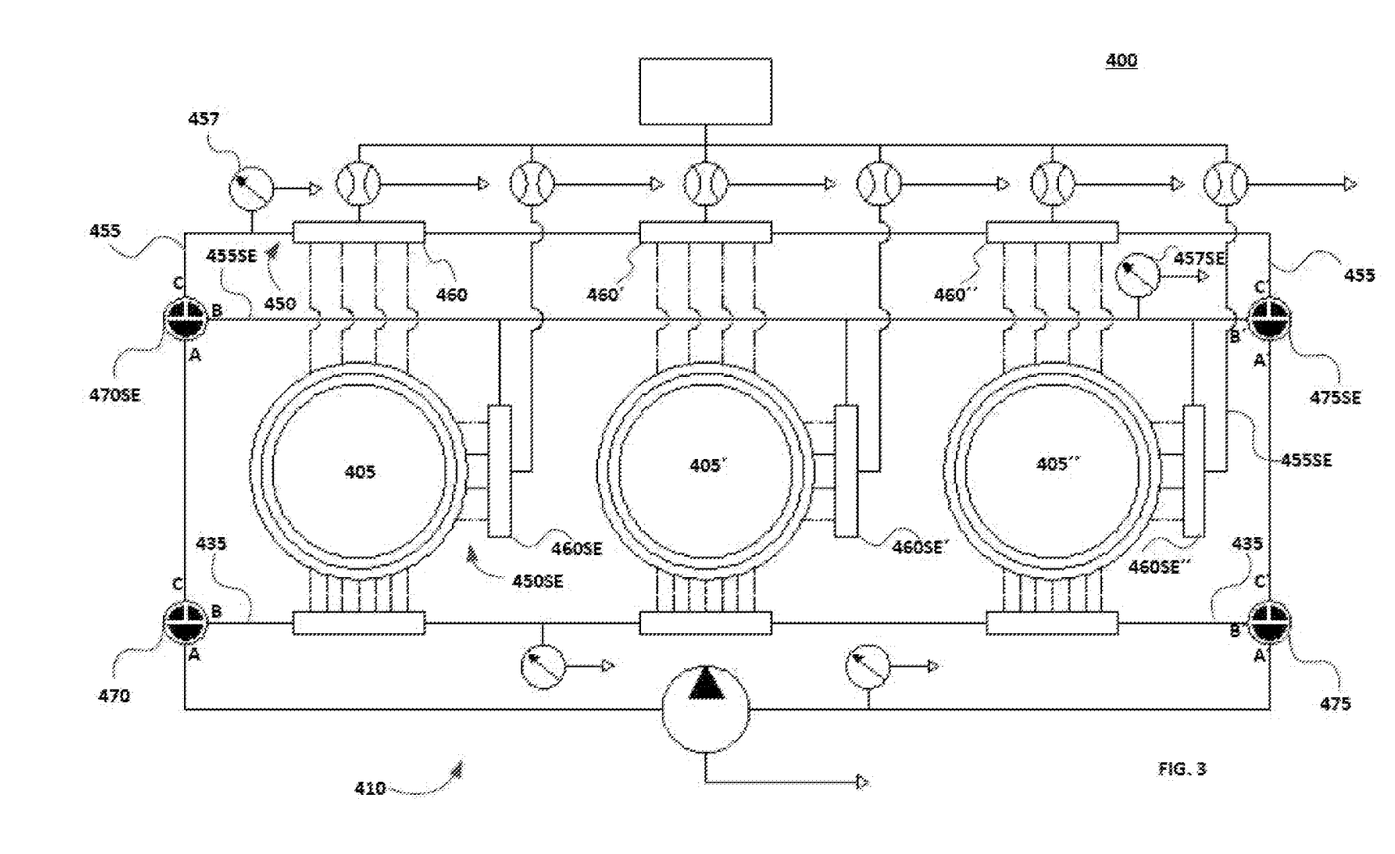
FIG. 3 is a block diagram of a bearing assembly according to another embodiment.

FIG. 3 is a block diagram of a bearing assembly according to another embodiment. Bearing assembly 400 may include three bearings 405, 405', 405" and lubrication system 410. Lubrication system 410 may include a pump circuit and an injection circuit similar to the pump circuit 220 and the injection circuit 230 described with reference to FIG. 1. Furthermore, lubrication system 410 may include primary extraction sub-circuit 450, secondary extraction sub-circuit 450SE and 3-way T-shaped valves 470, 475, 470SE and 475SE. Each of the 3-way valves 470, 475 may have a first port A, A' connected to the pump circuit, a second port B, B' coupled to the injection branch 435 and a third port C, C' connected to a lubrication line that leads to a first port A, A' of the 3-way pumps 470SE, 475SE, respectively. Each of the 3-way valves 470SE, 475SE may have a second port B, B' coupled to the extraction branch 455SE of the secondary extraction sub-circuit 450SE and a third port C, C' connected to the primary extraction sub-circuit 450.

Primary extraction sub-circuit 450 may have an extraction branch 455 and three extraction devices 460, 460', 460" distributed along the extraction branch 455, each device for extracting lubricant from a bearing, respectively. Extraction branch 455 may be connected to a lubrication line that leads at one end to port C of valve 470SE and at the other end to port C" of valve 475SE. A pressure measuring device 457 may monitor the lubricant pressure along the extraction branch 455.

Now, secondary extraction sub-circuit 450SE may have an extraction branch 455SE and three extraction devices 460SE, 460SE', 460SE" distributed along the extraction branch 455SE. Each of the extraction devices 460SE, 460SE', 460SE" shall be connected at or near their corresponding bearing 405, 405', 405", respectively, at a point where lubricant concentration may take place or where lubricant pressure tends to be higher. Extraction branch 455SE may be connected at one end to a lubrication line that leads to port B of valve 470SE and at the other end to port B' of valve 475SE. The extraction devices 460SE, 460SE, 460SE may also be connected to a flow-meter, as discussed with reference to FIG. 1, for measuring the volume of lubricant extracted from the respective bearing. Secondary extraction sub-circuit 450SE may further include a pressure measuring device 457SE, such as a manometer, for measuring the pressure of the lubricant at a point along the extraction branch 455SE.

The secondary extraction sub-circuit may be connected to the bearing substantially at or near a point on the bearing where concentration of lubricant is anticipated. In that way, should the device 457SE measure an increased pressure, it may be possible to selectively operate only the secondary lubricant extraction sub-circuit by appropriately orientating the 3-way T-valves valves. For example, if there is a need to only remove lubricant from pressure points of the bearings, the 3-way valves 470 and 475 shall have the vertical axis of the 3-way valves' T-shape facing outwards, while the 3-way valves 470SE and 475SE shall have the vertical axis of their T-shape facing towards the A, A' points. Therefore the pump circuit may be connected only with the secondary extraction sub-circuit 455SE and, thus, only extraction devices 460SE, 460SE', 460SE' may be operable. It should be noted that it may also be possible to provide extra manometers and extra 3-way valves along the secondary lubricant extraction sub-circuit 455SE, so that pressure may be measured at each bearing and the lubricant extraction may selectively be performed at one, two or all the bearings at any given moment.

Figure 4:
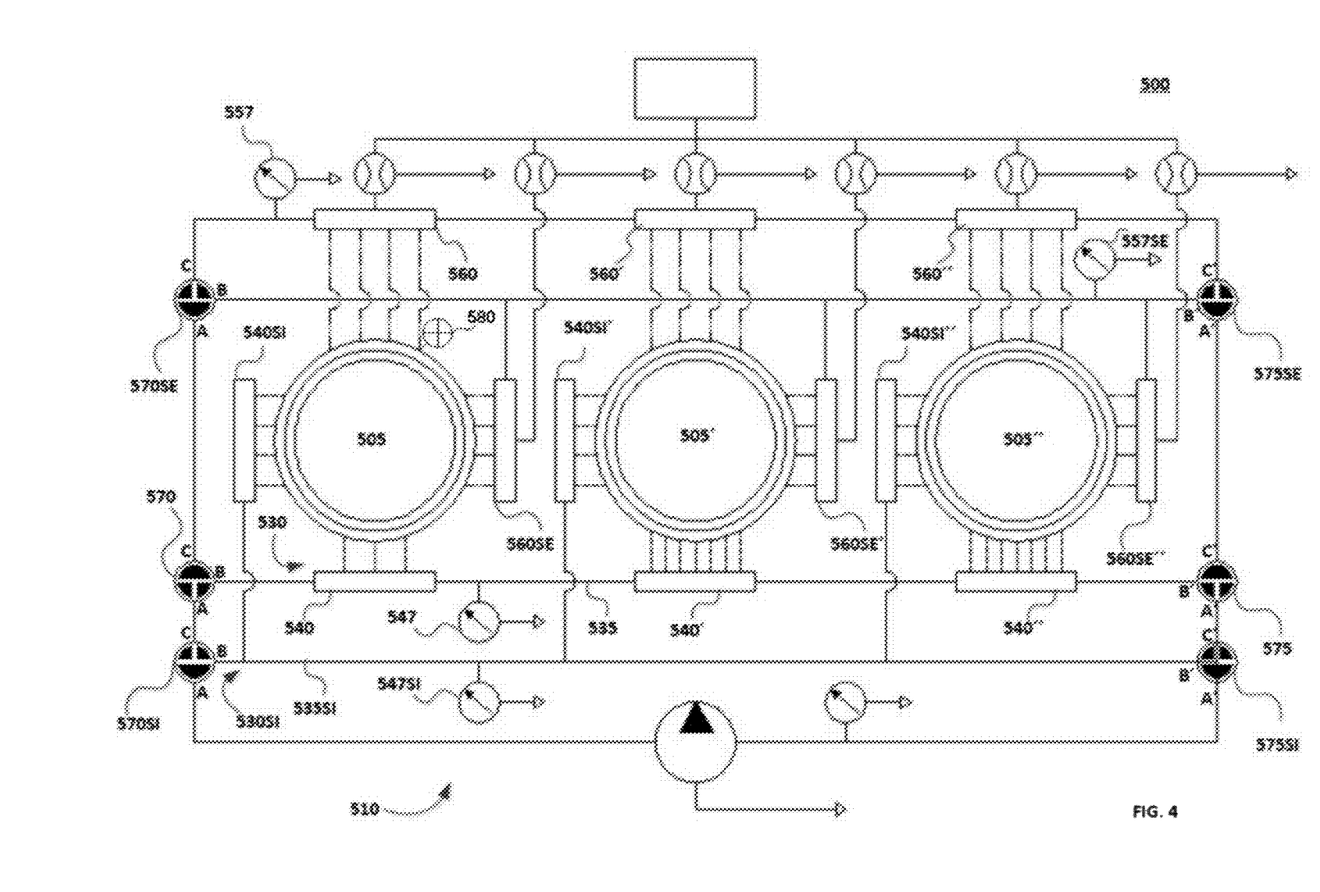
FIG. 4 is a block diagram of a bearing assembly according to another embodiment.

FIG. 4 is a block diagram of a bearing assembly according to yet another embodiment. Bearing assembly 500 may include three bearings 505, 505', 505" and lubrication system 510. Lubrication system 510 may include a pump circuit similar to the pump circuit 220 described with reference to FIG. 1, and an extraction circuit similar to the extraction circuit discussed with reference to FIG. 3. Furthermore, lubrication system 510 may include a primary injection sub-circuit 530, a secondary injection sub-circuit 530SI and 3-way T-shaped valves 570, 575, 570SI, 575SI, 570SE and 575SE. Each of the 3-way valves 570SI, 575SI may have a first port A, A' coupled to the pump circuit, a second port B, B' connected to the secondary injection branch 535SI and a third port C, C' connected to a lubrication line that leads to a first port A, A' of the 3-way valves 570, 575, respectively. Each of the 3-way valves 570, 575 may have a second port B, B' coupled to the primary injection branch 535 of the primary injection sub-circuit 530 and a third port C, C' connected to a lubrication line that leads to the first port A, A' of the 3-way valves 570SE, 575SE', respectively. The second port B, B' of the 3-way valves 570SE, 575SE', may be coupled to a secondary extraction sub-circuit and the third port C, C' may be coupled to a primary extraction sub-circuit. The primary extraction sub-circuit may include extraction devices 560, 560' and 560". Accordingly, the secondary extraction sub-circuit may include extraction devices 560SE, 560SE' and 560SE".

Primary injection sub-circuit 530 may have an injection branch 535 and three injection devices 540, 540', 540" distributed along the injection branch 535, each device for injecting lubricant to a bearing, respectively. Injection branch 535 may be connected at one end to a lubrication line that leads to port B of valve 570 and at the other end to port B' of valve 575. A pressure measuring device 547 may monitor the lubricant pressure along the injection branch 535.

Now, secondary injection sub-circuit 540SI may have an injection branch 535SI and three injection devices 560SI, 560SI', 560SI" distributed along the injection branch 535SI. Each of the injection devices 560SI, 560SI', 560SI" shall be connected at or near their corresponding bearing 505, 505', 505", respectively, at a point where lubricant shortage may take place or where lubricant pressure tends to be low. Injection branch 535SI may be connected at one end to a lubrication line that leads to port B of valve 570SI and at the other end to port B' of valve 575SI. Secondary injection sub-circuit 450SE may further include a pressure measuring device 547SI, such as a manometer, for measuring the pressure of the lubricant at a point along the injection branch 535SI.

The secondary injection sub-circuit may be connected to the bearings substantially at or near a point on the bearings where shortage of lubricant is anticipated. In that way, should the device 547SI measure a reduced pressure, it may be possible to selectively operate only the secondary lubricant injection sub-circuit by appropriately orientating the 3-way T-shape valves. For example, if there is a need to only inject lubricant to low pressure points of the bearings, the 3-way valves 570SI and 575SI shall have the vertical axis of the 3-way valves' T-shape facing towards the A, A' points. Therefore the pump circuit may be connected only with the secondary injection sub-circuit 530SI and, thus, only injection devices 560SI, 560SI', 560SI" may be operable. It should be noted that it may also be possible to provide extra manometers 580 and extra 3-way valves along the secondary lubricant injection sub-circuit 530SI, so that pressure may be measured at each bearing and the lubricant injection may selectively be performed at one, two or all the bearings at any given moment.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A lubrication system for a bearing assembly, the bearing assembly having at least one bearing, comprising:
 a pump circuit, having at least a pump;
 a lubricant injection circuit for providing lubricant from a deposit of fresh lubricant to the bearing during an injection mode of operation;
 a lubricant extraction circuit for extracting used lubricant from the bearing to a recovery tank during an extraction mode of operation;
 at least a first three-way valve, having a first port coupled to the pump circuit, a second port coupled to the lubricant injection circuit and a third port coupled to the lubricant extraction circuit,
 wherein the first three-way valve is operable among a first position, a second position and a third position, wherein the first position allows operation of the lubrication system in the injection mode, whereby the pump provides pressure to the lubricant injection circuit, the second position allows operation of the lubrication system in the extraction mode, whereby the pump provides pressure to the lubricant extraction circuit, and the third position allows operation of the lubrication system in both modes simultaneously, whereby the pump provides pressure to the lubricant injection circuit and to the lubricant extraction circuit simultaneously;
 a first monitoring element, coupled to the lubricant injection circuit and a second monitoring element, coupled to the lubricant extraction circuit;
 wherein the first three-way valve is operable by a controller in response to a volume of lubricant measured by at least one of the first and second monitoring elements; and wherein the second monitoring element is a flow meter and the first three-way valve defines a passageway between the pump and the lubricant extraction circuit when the second monitoring element indicates a lubricant volume is above a desired value and wherein the first three-way valve defines a passageway between the pump and the lubricant injection circuit when the flow meter indicates a volume below a desired value.

2. The lubrication system according to claim 1, further comprising a local pressure measuring instrument, coupled to the bearing, for measuring a pressure of lubricant at a proximal point of the bearing.

3. The lubrication system according to claim 2, wherein the lubricant extraction circuit includes a first lubricant extraction sub-circuit and a second lubricant extraction sub-circuit, the first lubricant extraction sub-circuit being coupled to the bearing substantially at or near the proximal point, and wherein the second lubricant extraction sub-circuit is coupled to the bearing at a point substantially removed from the proximal point, whereby the first lubricant extraction sub-circuit is selectively operated in response to a lubricant pressure measurement above a desired value and measured by the local pressure measuring instrument at the proximal point.

4. The lubrication system according to claim 3, wherein each sub-circuit further comprises a monitoring element.

5. The lubrication system according to claim 2, wherein the lubricant injection circuit includes a first lubricant injection sub-circuit and a second lubricant injection sub-circuit, the first lubricant injection sub-circuit being coupled to the bearing substantially at or near the proximal point, and wherein the second lubricant injection sub-circuit is coupled to the bearing at a point substantially removed from the proximal point, whereby the first lubricant injection sub-circuit is selectively operated in response to a lubricant pressure measurement below a desired value and measured by the local pressure measuring instrument at the proximal point.

6. The lubrication system according claim 1, wherein at least one monitoring element is a flow meter.

7. The lubrication system according claim 1, wherein at least one monitoring element is a manometer.

8. The lubrication system according claim 1, wherein the lubricant injection circuit and the lubricant extraction circuit are coupled to a plurality of bearings.

9. The lubrication system according to claim 8, wherein the lubricant injection circuit includes a plurality of lubricant injection devices each comprising the deposit of fresh lubricant, and each coupled to a bearing of the plurality of bearings, respectively, wherein each lubricant injection device comprises a plurality of injection lines, each injection line being coupled to the respective bearing at a different point.

10. The lubrication system according to claim 8, wherein the lubricant extraction circuit includes a plurality of lubricant extraction devices, each coupled to a bearing of the plurality of bearings, respectively, wherein each lubricant extraction device comprises a plurality of extraction lines, each extraction line being coupled to the respective bearing at a different point.

11. The lubrication system according to claim 10, wherein the lubricant injection circuit includes a plurality of lubricant injection devices, each coupled to a bearing of the plurality of bearings, respectively, wherein each lubricant injection device comprises a plurality of injection lines, each injection line being coupled to the respective bearing at a different point, and wherein the lubricant injection devices are arranged in series in the lubricant injection circuit and the lubricant extraction devices are arranged in series in the lubricant extraction circuit, respectively.

12. The lubrication system according to claim 8, wherein the bearing assembly is a pitch bearing assembly of a wind turbine generator.

13. The lubrication system according to claim 1,
further comprising a second three-way valve coupled to the pump, wherein the first three-way valve is coupled to a first lubricant injection device and to a first lubricant extraction device, and the second three-way valve is coupled to a last lubricant injection device and to a last lubricant extraction device.

14. The lubrication system according to claim 1, wherein the first three-way valve is an electro-valve controlled by a central lubrication control center.

15. A bearing assembly comprising: at least a bearing; and a lubrication system according to claim 1.

16. A wind turbine generator comprising a bearing assembly according to claim 15.

* * * * *